July 28, 1931. J. R. THORP 1,816,267
PROTECTIVE DEVICE
Filed March 2, 1928

Inventor
J. R. Thorp
by W. H. Lieber
Attorney

Patented July 28, 1931

1,816,267

UNITED STATES PATENT OFFICE

JOEL R. THORP, OF WEST ALLIS, WISCONSIN, ASSIGNOR TO THE FULTON COMPANY, OF WEST ALLIS, WISCONSIN, A CORPORATION OF WISCONSIN

PROTECTIVE DEVICE

Application filed March 2, 1928. Serial No. 258,492.

The present invention relates in general to improvements in appliances for preventing the unauthorized removal of automobile accessories or the like, and relates more specifically to improvements in the construction of devices for frustrating the attempted theft of tire valve parts and of the tire itself by deflation and subsequent removal thereof from the supporting wheel rim, the improvement being especially applicable as a protective device for spare tires and parts thereof.

An object of the invention is to provide improved means for preventing the unauthorized removal of tire valve elements, or the possible deflation and subsequent removal of an automobile tire, especially in cases where the tire is mounted upon a spare wheel or rim secured to the body of the vehicle. Another object of the invention is to provide a simple and effective anti-theft device for simultaneously locking a tire and wheel to the body of a car while at the same time preventing tampering with the tire valve. A further object of the invention is to provide an effective protective appliance which may be readily manufactured in quantity at minimum cost, and which will present a neat and inconspicuous appearance when in use. Still another object of the invention is to provide a tire valve protector in the form of a simple accessory which may be applied or removed by a novice without the aid of tools of any kind. These and other objects of the invention will be apparent from the following detailed description.

A clear conception of an embodiment of the invention and of the mode of manufacturing and of applying devices constructed in accordance therewith, may be had by referring to the drawings accompanying and forming a part of this specification in which like reference characters designate the same or similar parts in the several views.

Figures 1, 2:
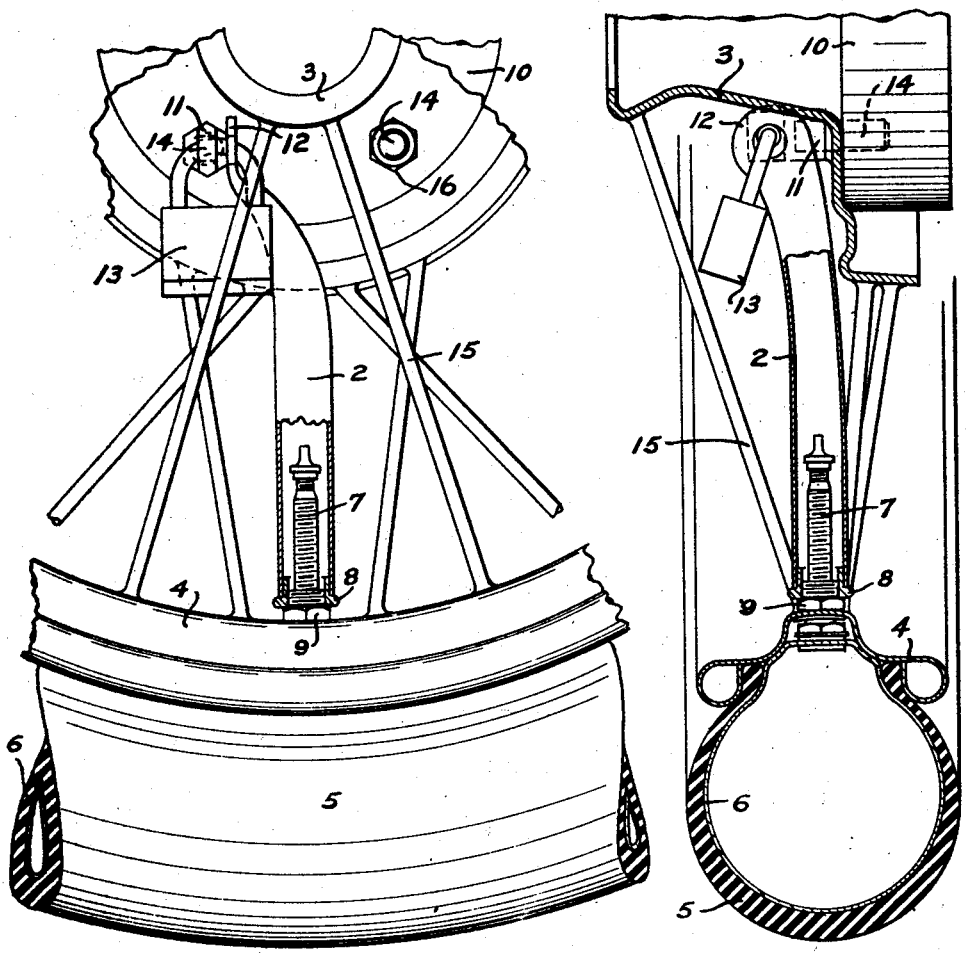
Fig. 1 is a fragmentary rear elevation of a tire embraced wire wheel and its supporting structure, showing the improved protective device partly in section.
Fig. 2 is a fragmentary central vertical section through the tire, wheel and a portion of the protective device.

While the invention has been specifically illustrated in the drawings, as applied in the form of an accessory especially adapted to protect the spare tire of the more recent models of Ford automobiles, it is not contemplated to restrict the scope of this application by such specific disclosure. The wheel specifically shown comprises a hub 3, a rim 4 secured to the hub by means of wire spokes 15, and a tire consisting of a casing 5 and an inner tube 6 embracing the rim 4. The hub 3 of the wheel is formed of sheet metal and is provided with a series of holes which normally receive the clamping studs by means of which the wheel is secured to an axle, but which are also adapted to fit over retaining studs 14 secured to a wheel carrier or support 10 when the wheel is used as a spare. When used as a spare, the hub 3 of the wheel is retained in position upon the studs 14 and the support 10, by means of ordinary nuts 16 coacting with all of the studs excepting one. This latter stud 14 may be provided with a special nut 11 having a hole therethrough for the purpose of enabling the nut 11 to be locked to an adjacent spoke 15 with a pad lock 13 so as to prevent unauthorized removal of the wheel. The casing 5 of the tire coacts with the wheel rim 4 in the usual manner as shown in Fig. 2, and is removable from the rim only when the inner tube 6 has been deflated. The inner tube 6 is provided with a threaded valve stem 7 which penetrates the wheel rim 4 and constitutes a support for a valve cap and valve inside of common construction. The valve stem 7 is held firmly in position by means of a special nut 9 of well known structure, having internal threads cooperable directly with the threads of the valve stem 7 in order to clamp the stem to the rim, and also having external threads formed for the reception of a valve enclosing cap, not shown.

The improved protective device comprises a tubular element 2 having one end provided with an anti-rattle socket 8 and having its opposite end 12 flattened and provided with a lateral perforation or hole. The socket 8 may be formed of any suitable material such as rubber or metal and may be attached to the end of the element 2 or to the interior thereof some distance beyond the end, in any convenient manner. This socket may also be provided with an internal thread adapted to coact with the external thread of the clamping nut 9, or it may be formed to merely slip over either the entire nut 9 or the externally threaded portion thereof only. When forming the protective element 2 of tubing, the end 12 may be flattened and bent as shown, but in any event, the length of the element 2 should be sufficient to cause the same to reach from the special nut 11 to the rim 4 so that the socketed end will substantially enclose the valve stem 7 and the parts associated therewith.

The mode of applying the improved protective device is so simple that a detailed description thereof is hardly necessary. When the wheel has been properly positioned upon the carrier or support 10 and the tire associated with the wheel has been inflated, the special nut 11 may be applied to one of the clamping studs 14 in the manner illustrated. The socketed end of the element 2 may then be slipped over and applied to the valve stem 7, and the opposite end 12 thereof subsequently locked to the special nut 11 with the aid of an ordinary pad lock 13. With the device thus applied and locked in position, it will be apparent that three important results are obtained. In the first place, the element 2 totally encloses and confines the removable parts of the tire valve thereby preventing removal thereof without releasing the lock 13. In the second place, the element 2 when locked in position, positively prevents deflation of the inner tube 6 through the valve stem 7 and avoids subsequent removal of the casing 5. In the third place, with the element 2 in engagement with the valve stem and locked to the nut 11, removal of the nut 11 and hence of the wheel, is positively prevented since the lock 13 and element 2 will not permit rotation of the nut 11 upon the adjacent stud 14. When the socket 8 is provided with internal threads coacting with the externally threaded portion of the nut 9, and the parts are assembled and locked as shown, it is impossible to remove the valve nut 9 and hence also impossible to remove the inner tube 6 without destruction thereof.

The improved protective device is obviously capable of use wherever the relative locations of the valve stem 7 and clamping studs 14, is such as to permit its application.

In the more recent models of Ford automobiles, the desired relation between these parts exists, and the nut 11 and lock 13 are ordinarily provided, thereby permitting attainment of the improved results by merely applying the element 2. The element 2 may also be manufactured from metal tubing at very moderate cost and may be applied without the aid of tools of any kind. When the element 2 has been applied, it presents an extremely inconspicuous and neat appearance, and the device may be removed at any time by merely releasing the wheel lock 13.

It should be understood that it is not desired to limit the invention to the exact details of construction herein shown and described, for various modifications within the scope of the appended claims may occur to persons skilled in the art.

It is claimed and desired to secure by Letters Patent:—

1. An article of manufacture comprising, a locking device having a tubular end portion movable outwardly over a wheel tire valve and having another portion cooperable directly with the hub fastening of the tire supporting wheel to prevent deflation of the tire when the wheel is fastened to its support.

2. An article of manufacture comprising, a locking device having an outer solid tubular portion formed to conceal a wheel tire valve and having an inner portion cooperable directly with the hub fastening of the tire supporting wheel to prevent deflation of the tire through said valve when the wheel is fastened to its support.

3. An article of manufacture comprising, a locking element having an end socket formed to slip endwise over a wheel tire valve stem and having its opposite end cooperable directly with the hub fastening of the tire supporting wheel so as to prevent deflation of the tire through the valve stem when the hub fastening is effective.

4. An article of manufacture comprising, a locking element having a socket at one end formed to directly engage the threads of a wheel tire valve nut and having a hole at its opposite end cooperable with the hub fastening of the tire supporting wheel so as to prevent removal of said element from the valve stem when confined by said hub fastening.

5. In combination with a wheel having a tire supporting rim rigidly attached to a hub, a pneumatic tire coacting directly with said rim and having a valve stem extending inwardly through an opening in the rim, and an element having one end fitted over said stem and having its opposite end formed for coaction with a hub clamping stud.

6. In combination with a wheel having a tire supporting rim rigidly attached to a hub, a pneumatic tire coacting with said rim and having a valve stem projecting therefrom, means for attaching the hub of said wheel to a support, and a single element embracing said stem and coacting directly with said attaching means.

7. In combination with a wheel having a tire supporting rim and a hub attached thereto, a tire coacting with said rim and having an inflating valve stem projecting toward said hub, a hub fastening for said wheel, and a tubular element having one end enclosing said valve stem and having its opposite end confined by said fastening.

8. An article of manufacture comprising, a locking device having a tubular end portion formed to conceal a wheel tire valve and having an opposite end portion cooperable with the hub fastening of the tire supporting wheel so as to prevent deflation of the tire through said valve when said device is confined by said hub fastening, said device being disposed entirely within the wheel rim.

9. An article of manufacture comprising, a locking device disposable entirely within the rim of a tire supporting wheel and having an outer socketed portion formed to embrace the tire valve and an inner portion coactable with the hub fastening of the wheel to prevent deflation of the tire through said valve.

10. A device of the class described comprising, a tubular element having one end formed for the reception of a tire valve stem and having its opposite end disposed adjacent to the hub of the tire supporting wheel, and a lock for attaching said opposite end to a hub fastener and for preventing removal of said element from the valve stem.

11. A device of the class described comprising, a tubular element having an end socketed for the endwise reception of a tire valve stem and having its opposite end disposed adjacent to the hub of the tire supporting wheel, and a lock for attaching said opposite end to a wheel hub fastener.

In testimony whereof, the signature of the inventor is affixed hereto.

JOEL R. THORP.